United States Patent
Shimazoe et al.

(10) Patent No.: US 9,562,609 B2
(45) Date of Patent: Feb. 7, 2017

(54) PLATE-INTEGRATED GASKET

(75) Inventors: Toshihiro Shimazoe, Makinohara (JP); Shigeru Watanabe, Makinohara (JP)

(73) Assignee: NOK Corporation (JP)

( * ) Notice: Subject to any disclaimer, the term of this patent is extended or adjusted under 35 U.S.C. 154(b) by 158 days.

(21) Appl. No.: 14/238,563

(22) PCT Filed: Aug. 2, 2012

(86) PCT No.: PCT/JP2012/069647
§ 371 (c)(1),
(2), (4) Date: Feb. 12, 2014

(87) PCT Pub. No.: WO2013/031466
PCT Pub. Date: Mar. 7, 2013

(65) Prior Publication Data
US 2014/0197605 A1    Jul. 17, 2014

(30) Foreign Application Priority Data

Sep. 2, 2011 (JP) ................................ 2011-191756
Oct. 18, 2011 (JP) ................................ 2011-228868

(51) Int. Cl.
*F16J 15/02* (2006.01)
*H01M 8/02* (2016.01)
(Continued)

(52) U.S. Cl.
CPC ........... *F16J 15/022* (2013.01); *F16J 15/0825* (2013.01); *F16J 15/104* (2013.01);
(Continued)

(58) Field of Classification Search
CPC ...... F16J 15/022; F16J 15/0825; F16J 15/104; F16J 15/123; F16J 15/085; F16J 15/0856; F16J 15/0887; F16J 15/064; F16J 15/061; F16J 15/062; F16J 15/02; F16J 2015/085; H01M 8/0247; H01M 8/0276; H01M 8/0297; H01M 8/0284; H01M 8/0273; Y02P 70/56; Y02E 60/50
(Continued)

(56) References Cited

U.S. PATENT DOCUMENTS 6,596,427 B1 *  7/2003  Wozniczka ......... H01M 8/0247
                                                   29/623.2
7,749,635 B2 *  7/2010  Kuroki ................. F16J 15/0818
                                                   277/650
(Continued)

FOREIGN PATENT DOCUMENTS

CN    101317298 A    12/2008
CN    101467289 A     6/2009
(Continued)

OTHER PUBLICATIONS

Extended European Search Report for Application No. EP 12 82 8940 dated Feb. 11, 2015 (6 pages).

*Primary Examiner* — Kristina Fulton
*Assistant Examiner* — Nathan Cumar
(74) *Attorney, Agent, or Firm* — Harness, Dickey & Pierce, P.L.C.

(57) ABSTRACT

The invention provides a plate-integrated gasket which can reduce a width necessary for installing seal members provided in a plurality of plates which are laminated on each other, and can achieve an improvement of productivity. In order to achieve this purpose, in the plate-integrated gasket, one plate and the other plate are laminated on each other, an outer peripheral surface of the one plate is fitted or loosely fitted to a stepped surface which is formed in the other plate, and a seal member made of an elastic material having a rubber-like elasticity is integrally formed astride both of the (Continued)

one plate and the other plate, and has a fixed portion filled in a seal fixing groove which is formed between the one plate and the other plate.

14 Claims, 18 Drawing Sheets

(51) Int. Cl.
  *F16J 15/08* (2006.01)
  *F16J 15/10* (2006.01)
  *F16J 15/12* (2006.01)

(52) U.S. Cl.
  CPC ......... *F16J 15/123* (2013.01); *H01M 8/0247* (2013.01); *H01M 8/0276* (2013.01); *H01M 8/0284* (2013.01); *H01M 8/0297* (2013.01); *F16J 2015/085* (2013.01); *F16J 2015/0856* (2013.01); *Y02E 60/50* (2013.01); *Y02P 70/56* (2015.11)

(58) Field of Classification Search
  USPC ........................ 277/590–595, 598, 637, 628, 640–644, 277/654; 429/507, 508, 509, 510
  See application file for complete search history.

(56) References Cited

U.S. PATENT DOCUMENTS

| | | | | |
|---|---|---|---|---|
| 2002/0051902 | A1* | 5/2002 | Suenaga | H01M 8/0273 |
| | | | | 429/535 |
| 2002/0094464 | A1* | 7/2002 | Wangerow | H01M 8/0271 |
| | | | | 429/434 |
| 2009/0261502 | A1 | 10/2009 | Arai | |

FOREIGN PATENT DOCUMENTS

| | | |
|---|---|---|
| EP | 1367301 A1 | 12/2003 |
| JP | 2002-050369 A | 2/2002 |
| JP | 2005-222708 A | 8/2005 |
| JP | 2007-335093 A | 12/2007 |
| WO | WO-2007-144717 A1 | 12/2007 |

* cited by examiner

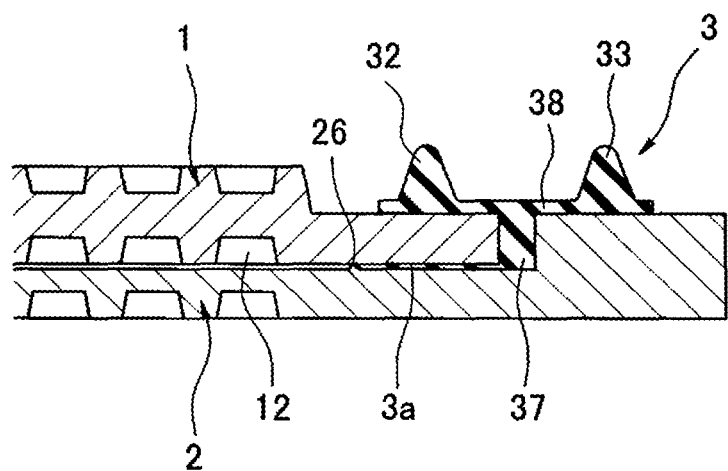
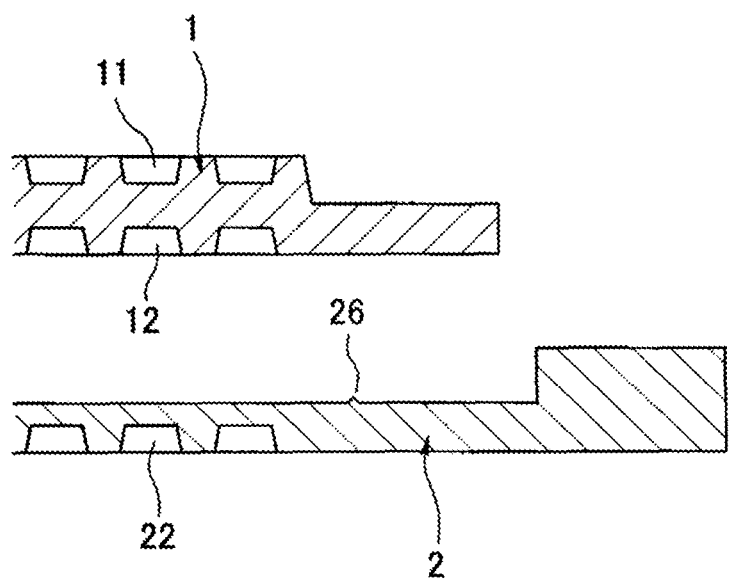

PRIOR ART

PRIOR ART

PLATE-INTEGRATED GASKET

CROSS-REFERENCE TO RELATED APPLICATIONS

This application is a U.S. National Stage Application of International Application No. PCT/JP2012/069647 filed on Aug. 2, 2012, and published in Japanese as WO 2013/031466 A1 on Mar. 7, 2013. This application claims priority to Japanese Application No. 2011-191756 filed Sep. 2, 2011 and Japanese Application No. 2011-228868 filed Oct. 18, 2011. The disclosures of the above applications are incorporated herein by reference.

BACKGROUND OF THE INVENTION

Field of the Invention

The present invention relates to a plate-integrated gasket which is used in a structure sealing a flow path between a plurality of plates by laminating the plates, for example, a fuel cell, and is structured such that a seal member made of an elastic material having a rubber-like elasticity is integrated in the plate.

Description of the Conventional Art

FIG. 23 shows an example of a gasket for a fuel cell in which a seal member made of an elastic material having a rubber-like elasticity is integrated in a separator of a fuel cell, as a plate-integrated gasket according to a prior art.

In the gasket for the fuel cell, each of reference numerals 101 and 102 denotes a plate-like separator which is made of a conductive material such as a carbon. Among them, on an upper surface of the first separator 101 in an upper side in FIG. 23, a flow path groove 101a, for example, for supplying one of fuel gas (hydrogen gas) and oxidant gas (air) is formed, and a seal member 103 for sealing the gas circulating through the flow path groove 101a is integrally bonded. Further, on a lower surface of the second separator 102 which is laminated in a lower side in FIG. 23, a flow path groove 102a, for example, for supplying the other of the fuel gas (the hydrogen gas) and the oxidant gas (the air) is formed, and a seal member 104 for sealing the gas circulating through the flow path groove 102a is integrally bonded, and on an upper surface of the second separator 102 which is superposed with the lower surface of the first separator 101, a flow path groove 102b, for example, for circulating a fluid such as a cooling water is formed, and a seal member 105 for sealing the fluid circulating through the flow path groove 102b is integrally bonded (refer, for example, to Japanese Unexamined Patent Publication No. 2005-222708).

In other words, this kind of fuel cell gasket is structured such that the seal members 103 to 105 are integrated in the separators 101 and 102 for improving an assembling property, however, it is necessary to separately form the seal member 103 in the separator 101 side and the seal members 104 and 105 in the second separator 102 side, so that a productivity is lower at that degree.

Further, FIGS. 24 and 25 show the other example of the fuel cell gasket in which the seal member made of the elastic material having the rubber-like elasticity is integrated in the separator, as the plate-integrated gasket according to the prior art.

In other words, in the case of the prior art shown in FIG. 24 or 25, the seal member 103 in the first separator 101 side and the seal members 104 and 105 in the second separator 102 side are provided at the positions which are deviated from each other, by making an outer peripheral dimension of the second separator 102 larger than an outer peripheral dimension of the first separator 101, and the seal members 104 and 105 are connected to each other via a communication hole 102c provided in the second separator 102. Accordingly, the seal members 103 to 105 can be formed in the separators 101 and 102 in one forming step by setting the first separator 101 and the second separator 102 in a laminated state to a metal mold 200 which is constructed by an upper mold 201 and a lower mold 202, for example, as shown in FIG. 26. Therefore, a productivity is improved in comparison with the structure in FIG. 23. In this example, the flow path groove 101b for circulating the cooling water is formed in the first separator 101 side.

However, in the case that heights h1 and h2 of the seal member 103 in the separator 101 side and the seal member 105 in the second separator 102 side are different due to existence of the step in the laminating direction between the first separator 101 and the second separator 102 such as an example shown in FIG. 25, it becomes hard to align properties caused by compressibility ratios of the seal members 103 and 105 in an assembled state.

Further, in the prior arts in FIGS. 24 and 25, since seal fixing grooves 101c and 102d for constraining the seal members 103 and 105 in relation to inner and outer peripheral directions are structured such as to be independently provided in the first separator 101 and the second separator 102, as well as the outer peripheral dimension of the second separator 102 is made larger than the outer peripheral dimension of the first separator 101, a width w of an area in which the seal members 103 and 105 are provided becomes larger in comparison with the example in FIG. 23. As a result, a size of a whole of the fuel cell is increased.

Further, as shown in FIG. 26, since the metal mold 200 used for molding needs a plurality of injection ports 203a and 204a for separately filling a molding rubber material into a cavity 203 for molding the seal member 103 in the first separator 101 side, and a cavity 204 for molding the seal members 104 and 105 in the second separator 102 side, there is pointed out such a problem that a structure of the metal mold 200 becomes complicated.

SUMMARY OF THE INVENTION

Problem to be Solved by the Invention

The present invention is made by taking the points as mentioned above into consideration, and a technical object of the present invention is to provide a plate-integrated gasket which can reduce a width necessary for installing seal members provided in a plurality of plates which are laminated on each other, and can achieve an improvement of productivity.

Means for Solving the Problem

As a means for effectively solving the technical object mentioned above, a plate-integrated gasket according to the first aspect of the present invention is structured such that one plate and the other plate are laminated on each other, an outer peripheral surface of the one plate is fitted or loosely fitted to a stepped surface which is formed in the other plate, and a seal member made of an elastic material having a rubber-like elasticity is integrally formed astride both of the one plate and the other plate, and has a fixed portion filled in a seal fixing groove which is formed between the one plate and the other plate.

Further, a plate-integrated gasket according to the second aspect of the present invention is structured such that in the structure described in the first aspect, the seal fixing groove is formed between the outer peripheral surface of the one plate and the stepped surface of the other plate.

Further, a plate-integrated gasket according to the third aspect of the present invention is structured such that in the structure described in the first or second aspect, a stopper inhibiting the fixed portion from getting away from the seal fixing groove is formed in the seal member.

Further, a plate-integrated gasket according to the fourth aspect of the present invention is structured such that in the structure described in the third aspect, the stopper is extended from the fixed portion, and is locked to an expanded portion which is formed in the seal fixing groove.

Further, a plate-integrated gasket according to the fifth aspect of the present invention is structured such that in the structure described in any one of the first to the fourth aspects, one of respective laminated surfaces of the one plate and the other plate is provided with a burr stop projection which is brought into close contact with the other.

Further, a plate-integrated gasket according to the sixth aspect of the present invention is structured such that in the structure described in any one of the first to the fourth aspects, a projection is provided in one of respective laminated surfaces of the one plate and the other plate, a groove loosely fitted to the projection is provided in the other, and a burr stop labyrinth clearance gap is formed by the projection and the groove which are loosely fitted to each other.

Effect of the Invention

On the basis of the plate-integrated gasket according to the present invention, since the seal member is integrally formed astride both of the one plate and the other plate, and has the fixed portion which is filled in the seal fixing groove formed between the one plate and the other plate, it is possible to make the width necessary for installing the seal member in the plate smaller in comparison with the case the seal fixing grooves are independently provided in both of the plates and the seal members are provided separately in the seal fixing grooves. Further, since the seal member has the fixed portion which is filled in the seal fixing groove formed between the one plate and the other plate, it is possible to prevent the seal member from being deviated by a pressure of a fluid to be sealed. Further, since the seal members provided in the one plate and the other plate are continuously formed, it is possible to manufacture the seal members in one molding process, and it is possible to achieve an improvement of productivity.

Further, even in the case that the fluid pressure acts between both the plates, it is possible to securely prevent the fixed portion of the seal member from getting away from the seal fixing groove by the fluid pressure, by means of the stopper formed in the seal member, and it is possible to secure a reliability of a sealing function.

Further, since the burr stop projection or the burr stop labyrinth clearance gap is provided, it is possible to prevent the molding material from flowing out to the gap between the one plate and the other plate due to the molding pressure at the molding time of the seal member, and it is possible to form a product having a high quality.

BRIEF EXPLANATION OF THE DRAWINGS

FIG. 16 is a partly cross sectional view showing a single-sided lip type gasket for a fuel cell as a sixth embodiment of the plate-integrated gasket according to the present invention;

FIG. 17 is a partly cross sectional view showing a separated state of separators in the sixth embodiment;

DETAILED DESCRIPTION OF PREFERRED EMBODIMENTS

A description will be in detail given below of a preferable embodiment in which a plate-integrated gasket according to the present invention is applied to a gasket for a fuel cell, with reference to the accompanying drawings.

Figure 1:
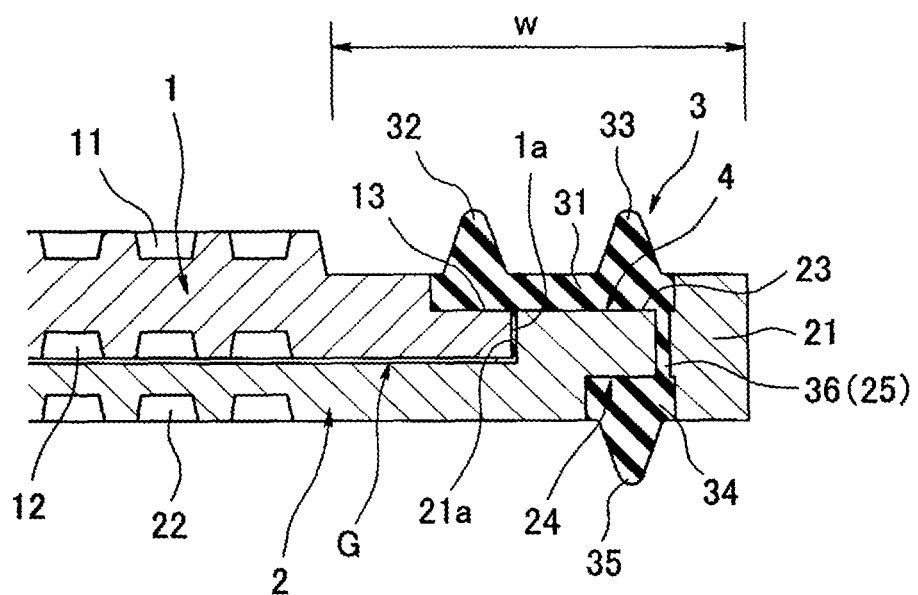
FIG. 1 is a partly cross sectional view showing a double-sided lip type gasket for a fuel cell as a first embodiment of a plate-integrated gasket according to the present invention.

First of all, FIG. 1 shows a double-sided lip type gasket for a fuel cell as a first embodiment. In the seal structure, reference numerals 1 and 2 denote a plate-like separator which is made of a conductive material, for example, a carbon, and correspond to plates described in the first aspect of the present invention. The separators 1 and 2 are laminated on each other, and an outer peripheral surface 1a of the first separator 1 in an upper side of the drawing is fitted to a stepped surface 21a which is formed toward an inner peripheral side along an outer peripheral portion 21 of the second separator 2 in a lower side.

A first flow path groove 11 is formed on an upper surface of the first separator 1, and a second flow path groove 12 is formed on an opposite surface thereto, that is, on a lower surface which is superposed with an upper surface of the second separator 2. On the other hand, a third flow path groove 22 is formed on a lower surface of the second separator 2.

Figure 2A:
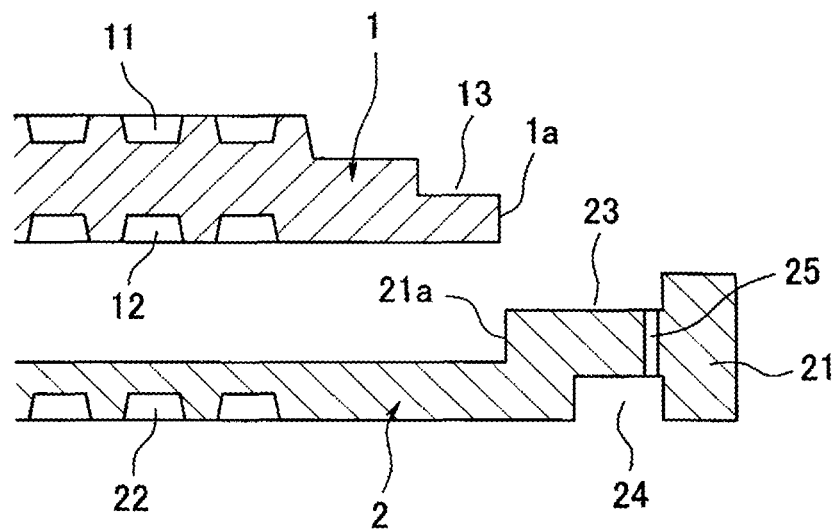
FIGS. 2A and 2B are partly cross sectional views showing a separated state and a combined state of separators in the first embodiment.
Figure 2B:
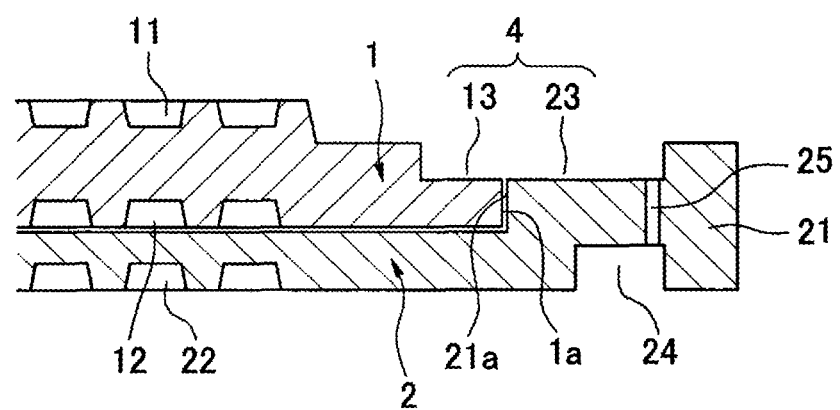

As shown in FIG. 2A, a step-like groove 13 directed to an upper side and an outer peripheral side is formed on an upper surface of the outer peripheral portion of the first separator 1, and a step-like groove 23 directed to an upper side and an inner peripheral side is formed in a stepped surface 21a side on the upper surface of the outer peripheral portion 21 of the second separator 2. As shown in FIG. 2B, in a state in which the first separator 1 and the second separator 2 are laminated on each other and the outer peripheral surface 1a of the first separator 1 is fitted to the stepped surface 21a of the second separator 2, the step-like groove 13 of the first separator 1 and the step-like groove 23 of the second separator 2 form a continuous seal fixing groove 4 via the fitting portion between the outer peripheral surface 1a and the stepped surface 21a.

Further, a seal fixing groove 24 is formed on a lower surface of the outer peripheral portion 21 of the second separator 2, and is communicated with the step-like groove 23 (the seal fixing groove 4) via a communication hole 25 which is provided in the outer peripheral portion 21.

Reference numeral 3 denotes a seal member which is integrally formed astride upper surfaces of both of the first separator 1 and the second separator 2, and the seal member 3 is made of an elastic material having a rubber-like elasticity (a rubber material or a synthetic resin material having a rubber-like elasticity).

In more detail, the seal member 3 has a plate-like fixed base portion 31 which is integrally bonded to an inner surface of the seal fixing groove 4 astride the first separator 1 and the second separator 2 by being filled in the seal fixing groove 4 constructed by the step-like groove 13 of the first separator 1 and the step-like groove 23 of the second separator 2, and is constrained in relation to inner and outer peripheral directions, a first seal lip 32 which is positioned on the step-like groove 13 of the first separator 1, protrudes out of the fixed base portion 31 and is formed as a chevron shape in its cross section, a second seal lip 33 which is positioned on the step-like groove 23 of the second separator 2, protrudes out of the fixed base portion 31 and is formed as a chevron shape in its cross section, a second fixed base portion 34 which is integrally bonded to the inner surface of the seal fixing groove 24 by being filled in the seal fixing groove 24 of the second separator 2, and is constrained in relation to inner and outer peripheral directions, and a third seal lip 35 which protrudes out of the second fixed base portion 34 and is formed as a chevron shape in its cross section. The second fixed base portion 34 is connected to the fixed base portion 31 via a bridging portion 36 which is filled in the communication hole 25 of the second separator 2 and is made of the elastic material having the rubber-like elasticity. The fixed base portion 31 in FIG. 1 corresponds to the fixed portion described in the first aspect of the present invention.

The first seal lip 32 and the second seal lip 33 are structured such as to seal the fluid flowing through the first flow path groove 11, the fixed base portion 31 is structured such as to seal the fluid flowing through the second flow path groove 12 by being filled in the seal fixing groove 4 so as to occlude the fitting portion between the outer peripheral surface 1a of the first separator 1 and the stepped surface 21a of the second separator 2, and the third seal lip 35 is structured such as to seal the fluid flowing through the third flow path groove 22. A part of the elastic material of the fixed base portion 31 interposes in a part of the fitting portion.

Figure 24:
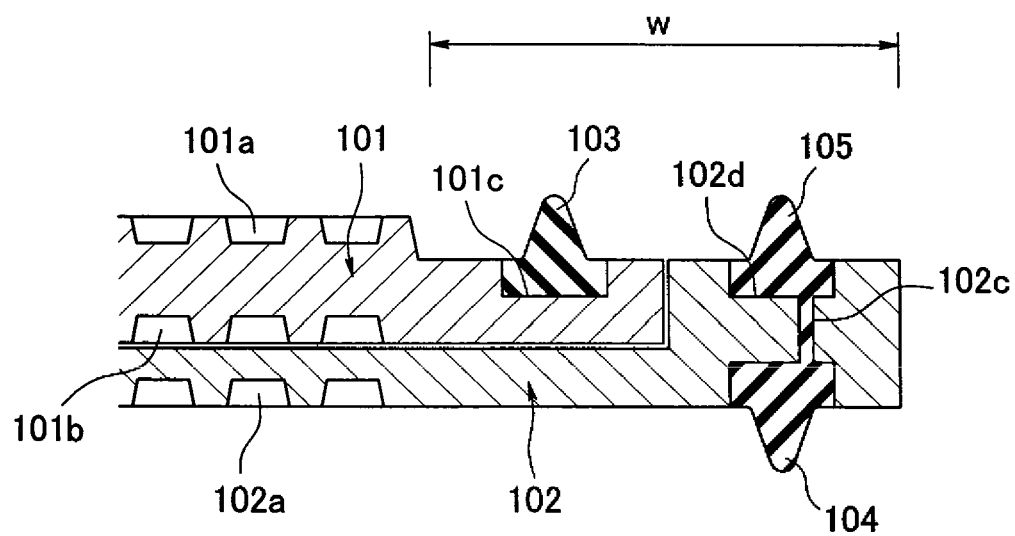
FIG. 24 is a partly cross sectional view showing a gasket for a fuel cell as the other example of the plate-integrated gasket according to the prior art.
Figure 25:
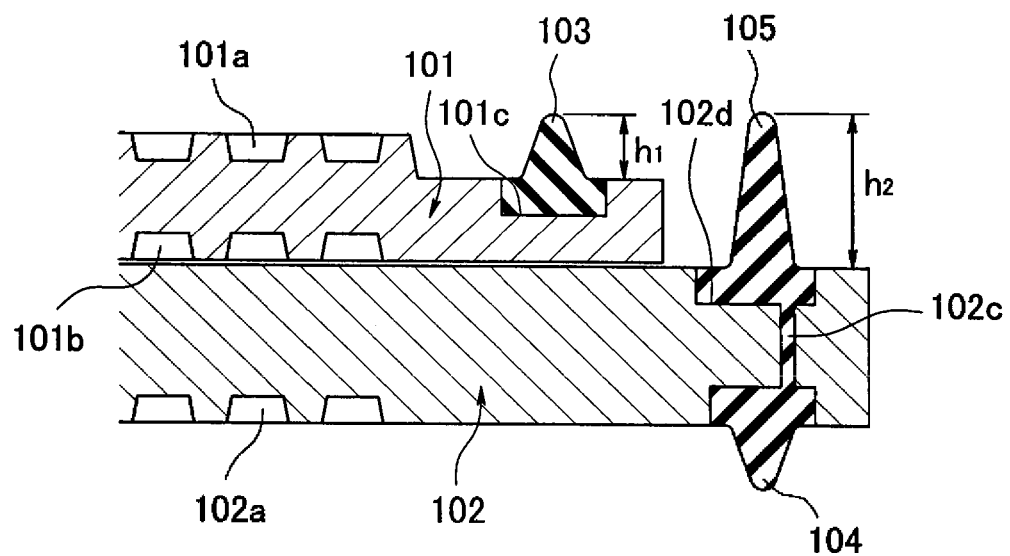
FIG. 25 is a partly cross sectional view showing a gasket for a fuel cell as the other example of the plate-integrated gasket according to the prior art.
Figure 26:
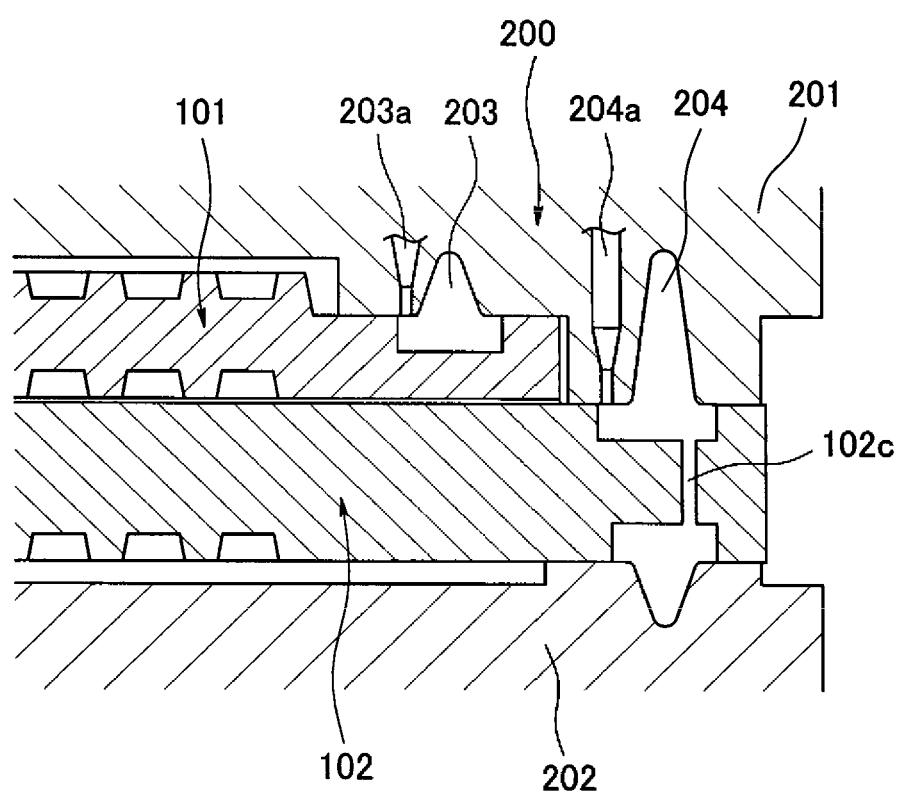
FIG. 26 is a partly cross sectional view showing a metal mold for manufacturing the gasket for the fuel cell in FIG. 25, and separators which are set to the metal mold.

According to the plate-integrated gasket (the double-sided lip type gasket for the fuel cell) of the first embodiment structured as mentioned above, since the seal member 3 is filled its fixed base portion 31 in the seal fixing groove 4 which is constructed by the step-like groove 13 of the first separator 1 and the step-like groove 23 of the second separator 2, and is integrally formed astride both of the first separator 1 and the second separator 2, it is possible to make a necessary width w for installing the seal member 3 smaller, in comparison with the case that the seal fixing grooves 101c and 102d are independently provided in the first separator 101 and the second separator 102, and the seal members 103 and 105 are separately provided in the seal fixing grooves 101c and 102d, such as the prior art shown in FIG. 24 which is previously described.

Further, since the fixed base portion 31 and the first and second seal lips 32 and 33 in the upper side in FIG. 1 and the second fixed base portion 34 and the third seal lip 35 in the lower side are connected to each other via the bridging portion 36 filled in the communication hole 25 which is provided in the outer peripheral portion 21 of the second separator 2, the seal member 3 can be manufactured in one molding process.

Figure 3:
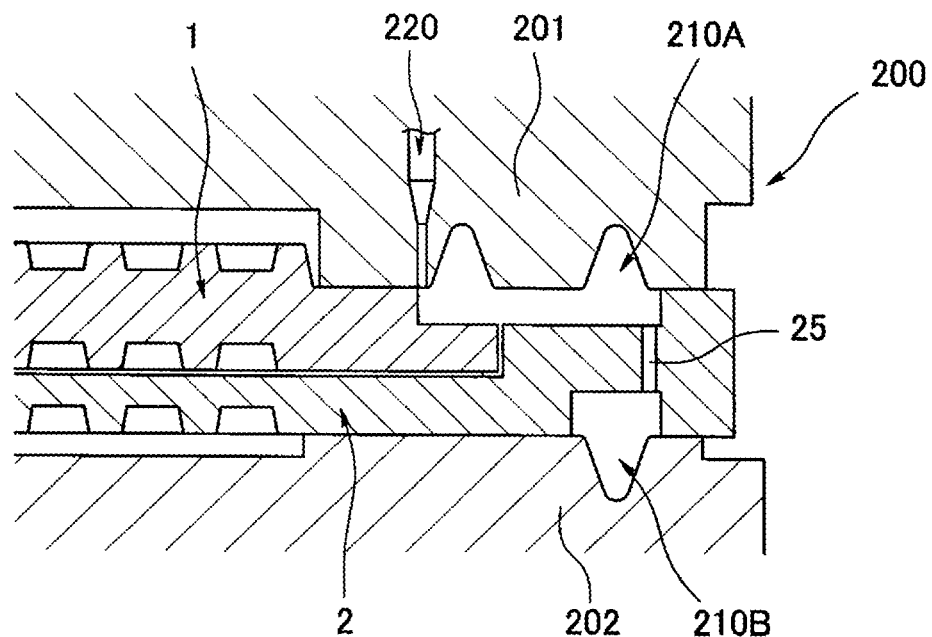
FIG. 3 is a partly cross sectional view showing a metal mold for manufacturing the double-sided lip type gasket for the fuel cell according to the first embodiment, and the separators which are set in the metal mold.

In detail, as shown in FIG. 3, in the case that the first separator 1 and the second separator 2 are set to the metal mold 200 constructed by the upper mold 201 and the lower mold 202 in a state of being laminated and fitted to each other, and are mold clamped, and an unvulcanized molding rubber material is filled, for example, in a cavity 210A which is defined between an inner surface of the upper mold 201, and the first separator 1 and the second separator 2, that is, the cavity 210A which forms the fixed based portion 31 and the first and second seal lips 32 and 33, via an injection port 220 which is provided in the upper mold 201, the molding rubber material is filled also in a cavity 210B which forms the second fixed base portion 34 and the third seal lip 35 in an opposite side through the communication hole 25 of the second separator 2, and gives a structure. Accordingly, the fixed base portion 31 and the first and second seal lips 32 and 33 in the upper side, and the second fixed base portion 34 and the third seal lip 35 in the lower side are simultaneously molded by supplying the material from the single injection port 220, and it is possible to achieve an improvement of the productivity.

Further, since the first separator 1 and the second separator 2 are integrally formed via the seal member 3, it is possible to handle the first separator 1, the second separator 2 and the seal member 3 as one assembly, and it is possible to further improve an embedding property.

Figure 4:
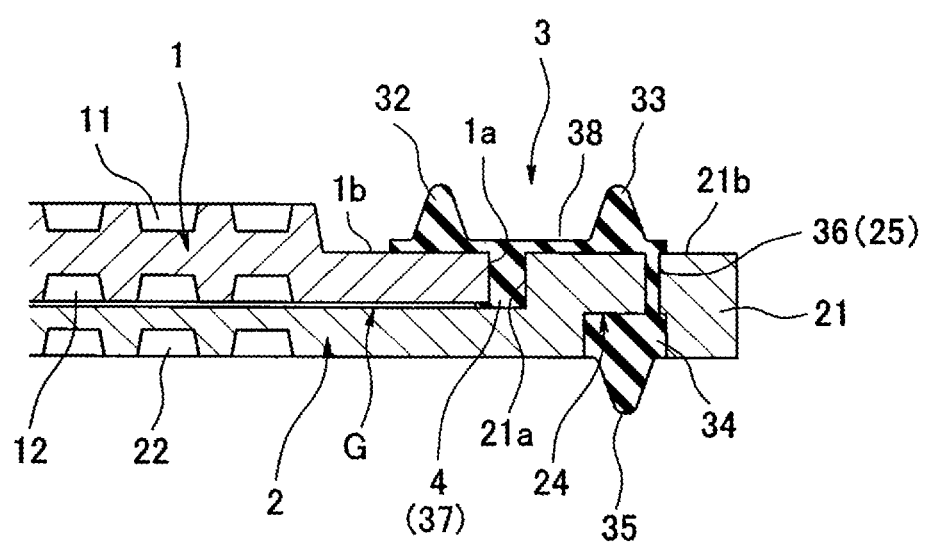
FIG. 4 is a partly cross sectional view showing a double-sided lip type gasket for a fuel cell as a second embodiment of the plate-integrated gasket according to the present invention.

Next, FIG. 4 shows a double-sided lip type gasket for a fuel cell as a second embodiment of the plate-integrated gasket according to the present invention.

A description will be given of a different point from the embodiment in FIG. 1 mentioned above, in the embodiment. The seal fixing groove 4 is formed between the outer peripheral surface 1a of the first separator 1 and the stepped surface 21a of the second separator 2 facing to the outer periphery surface 1a. Further, the seal member 3 has a fixed convex portion 37 which is integrally bonded to the inner surface of the seal fixing groove 4 by being filled in the seal fixing groove 4, and is constrained in relation to inner and outer peripheral directions, and a sheet-like base portion 38 which is extended from the fixed convex portion 37 so as to be integrally bonded astride an upper surface 1b of the outer peripheral portion of the first separator 1 and an upper surface 21b of the outer peripheral portion 21 of the second separator 2, and is formed as a plate shape. The first seal lip 32 is positioned on the first separator 1 so as to protrude out of the sheet-like base portion 38, and the second seal lip 33 is positioned on the second separator 2 so as to protrude out of the base portion 38. The fixed convex portion 37 corresponds to the fixed portion described in the first aspect of the present invention.

Figure 5A:
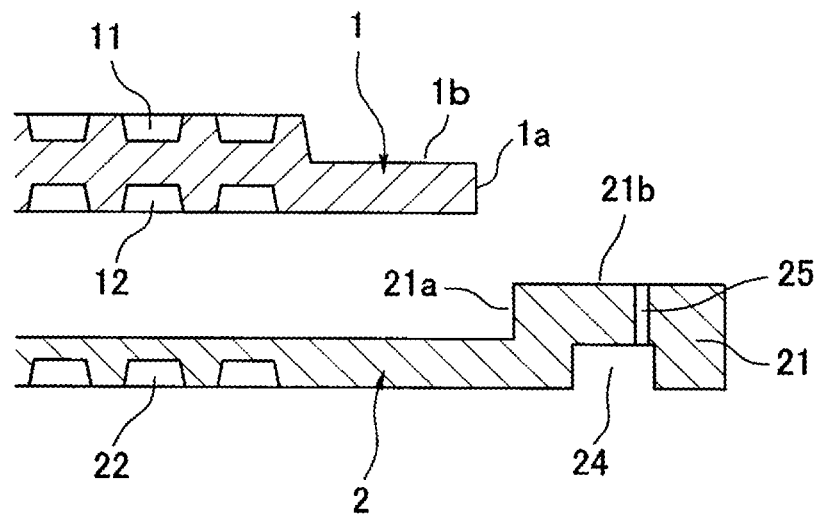
FIGS. 5A and 5B are partly cross sectional views showing a separated state and a combined state of separators in the second embodiment.
Figure 5B:
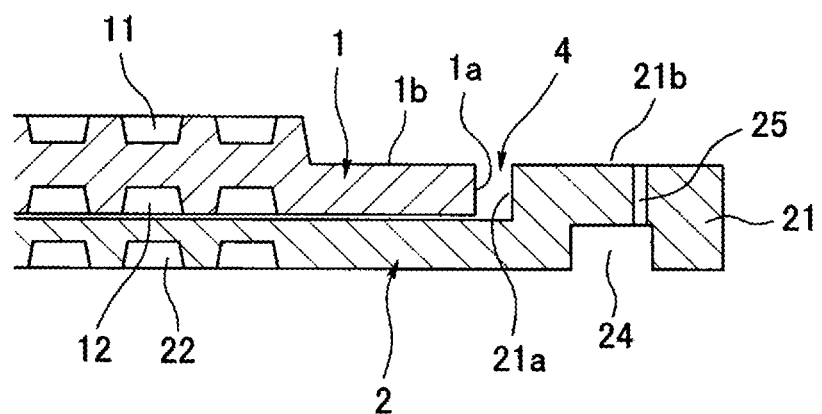

In other words, as shown in FIG. 5A, the upper surface 1b of the outer peripheral portion of the first separator 1 and the upper surface 21b of the outer peripheral portion 21 of the second separator 2 are formed flat. As shown in FIG. 5B, the upper surfaces 1b and 21b form approximately the same plane by laminating the first separator 1 and the second separator 2 on each other and loosely fitting the outer peripheral surface 1a of the first separator 1 to the inner periphery of the stepped surface 21a of the second separator 2, and the seal fixing groove 4 is formed between the outer peripheral surface 1a of the first separator 1 and the stepped surface 21a of the second separator 2.

The second embodiment structured as mentioned above achieves the same effect as that of the first embodiment described above. In other words, since the seal member 3 is integrally formed astride both of the first separator 1 and the second separator 2, it is possible to reduce a width which is necessary for installing the seal member, in comparison with the prior art shown in FIG. 24 described above. Further, since the sheet-like base portion 38 and the first and second seal lips 32 and 33 in the upper side and the second fixed base portion 34 and the third seal lip 35 in the lower side can be simultaneously formed, it is possible to achieve an improvement of productivity, and it is possible to handle the first separator 1, the second separator 2 and the seal member 3 as one assembly with each other.

Further, since the seal fixing groove 4 is formed between the outer peripheral surface 1a of the first separator 1, and the stepped surface 21a of the second separator 2 facing to the outer peripheral surface 1a, it is possible to simplify the shape.

Figure 6:
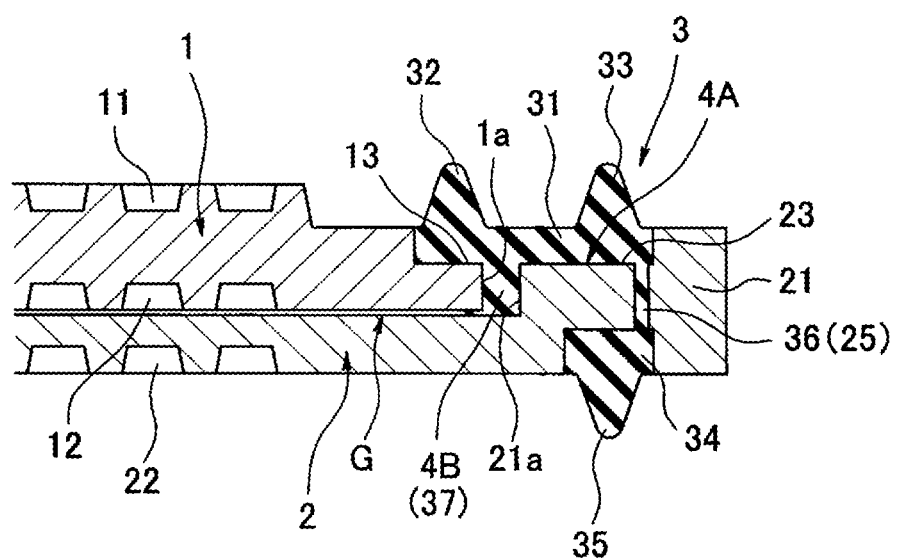
FIG. 6 is a partly cross sectional view showing a double-sided lip type gasket for a fuel cell as a third embodiment of the plate-integrated gasket according to the present invention.

Next, FIG. 6 shows a double-sided lip type gasket for a fuel cell as a third embodiment of the plate-integrated gasket according to the present invention.

The embodiment is provided with both the features of the first embodiment and the second embodiment mentioned above. In other words, the step-like groove 13 directed to the upper side and the outer peripheral side is formed in the upper surface of the outer peripheral portion of the first separator 1, and the step-like groove 23 directed to the upper side and the inner peripheral side is formed in the stepped surface 21a side in the upper surface of the outer peripheral portion 21 of the second separator 2. In a state in which the first separator 1 and the second separator 2 are laminated on each other, and outer peripheral surface 1a of the first separator 1 is fitted to the stepped surface 21a of the second separator 2, the step-like groove 13 of the first separator 1 and the step-like groove 23 of the second separator 2 form a seal fixing groove 4A, and the outer peripheral surface 1a of the first separator 1 and the stepped surface 21a of the second separator 2 form a seal fixing groove 4B which extends from an intermediate portion of the seal fixing groove 4A.

As a result, the seal member 3 is structured such as to have the plate-like fixed base portion 31 which is integrally bonded to an inner surface of the seal fixing groove 4A, and the fixed convex portion 37 which extends from the fixed base portion 31 so as to be integrally bonded to an inner surface of the seal fixing groove 4B. The other structures are the same as those of the embodiment in FIG. 1.

Accordingly, the third embodiment can also achieve the same effect as that of the first embodiment described above.

Figure 7A:
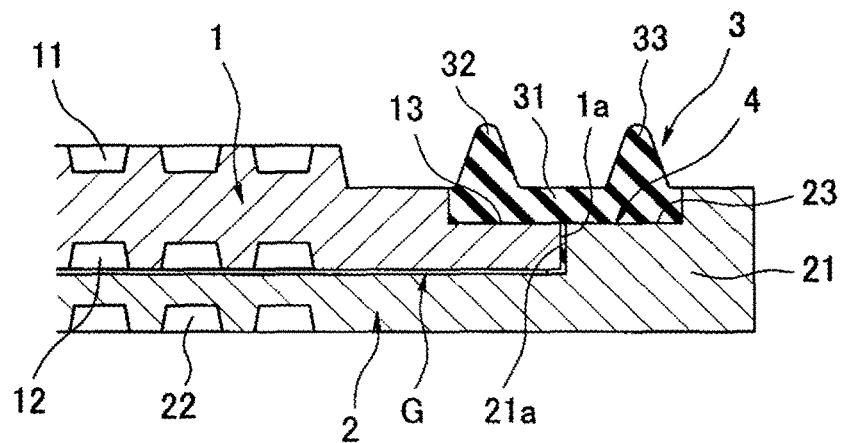
FIGS. 7A, 7B and 7C are partly cross sectional views respectively showing a plurality of examples in which the first to third embodiments of the plate-integrated gasket according to the present invention are applied to a single-sided lip type gasket for a fuel cell.
Figure 7B:
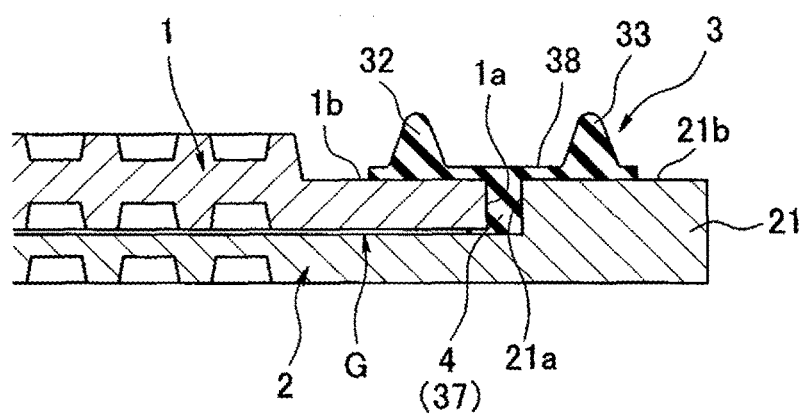
Figure 7C:
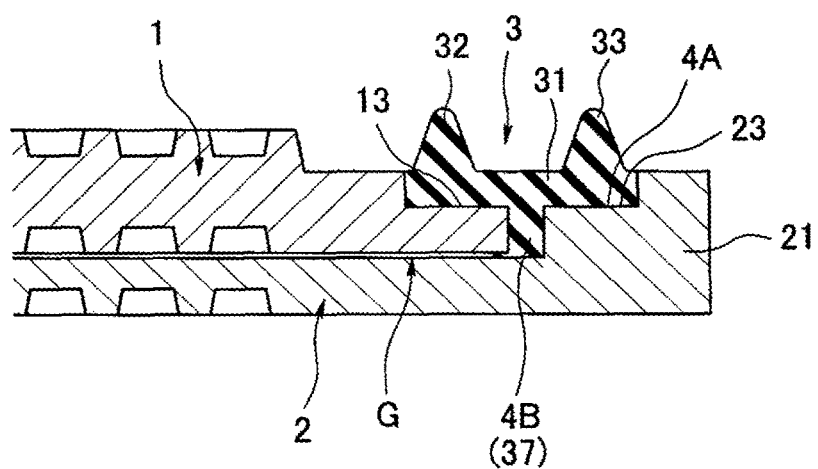

FIGS. 7A to 7C show examples in which plate-integrated gaskets according to the present invention are respectively applied to the single-sided lip type gasket for the fuel cell, and these examples are different from the first to third embodiments mentioned above only in a point that the third seal lip 35 does not exist.

Figure 8A:
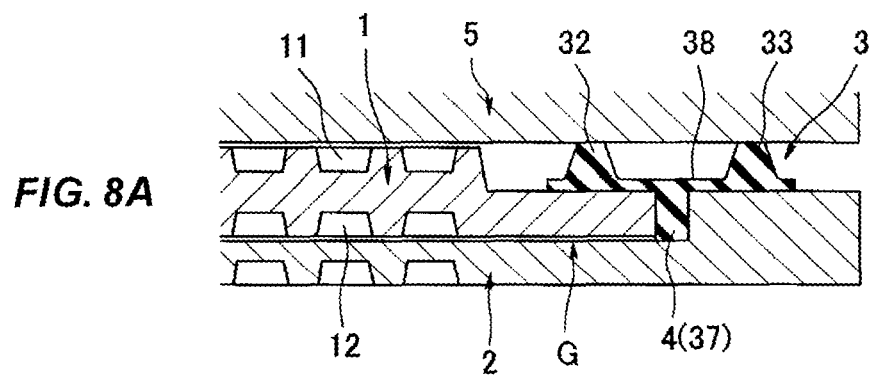
FIGS. 8A, 8B, 8C and 8D are views for explaining a possibility that the gasket breaks away from the separator, in the plate-integrated gasket according to the present invention.
Figure 8B:
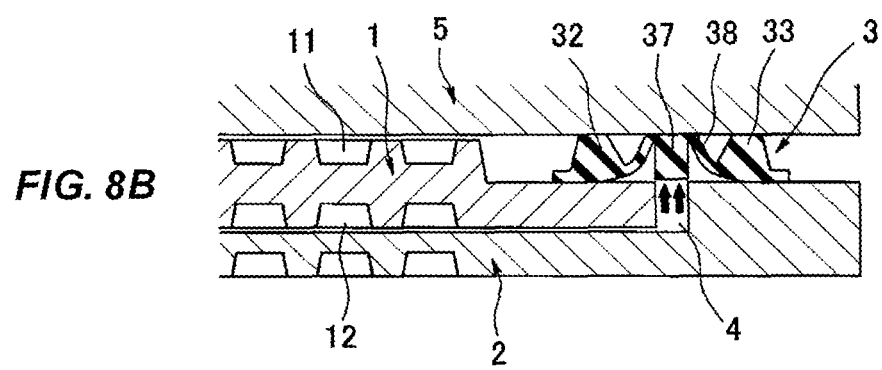
Figure 8C:
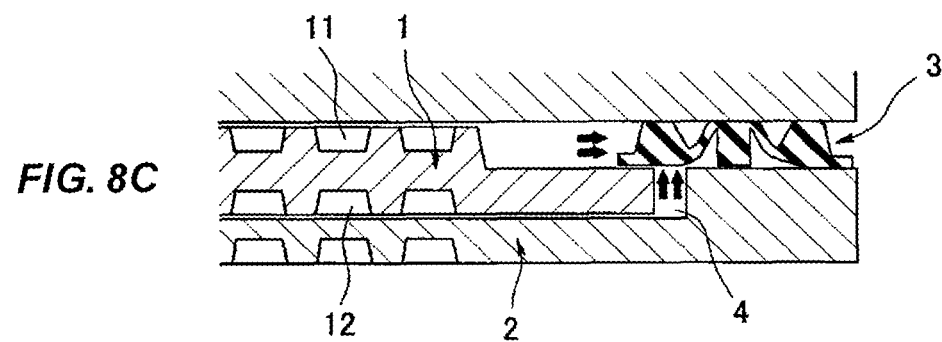
Figure 8D:
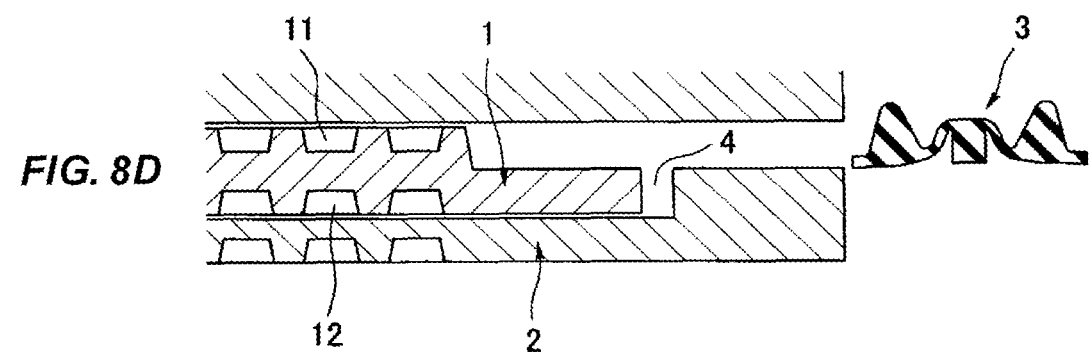

In the structure according to each of the embodiments mentioned above, the fixed base portion 31, or the fixed convex portion 37 and the sheet-like base portion 38 in the seal member 3 are structured such as to seal the fluid flowing through the second flow path groove 12 by being filled in the seal fixing groove 4 so as to occlude the fitting portions of the outer peripheral surface 1a of the first separator 1 and the stepped surface 21a of the second separator 2, and a pressure receiving area against the fluid from a gap G between the laminated surfaces of the first separator 1 and the second separator 2 is small. Therefore, a sufficient seal performance can be obtained. However, even in the case that the first and second seal lips 32 and 33 come into close contact with the other member (for example, a membrane-electrode compound material) 5 in an appropriately compressed state as shown in FIG. 8A, there is fear that the fixed convex portion 37 which exists between the first and second seal lips and is not exposed to the compressive reaction force of the first and second seal lips 32 and 33 (or the intermediate portion of the fixed base portion 31 in FIG. 1) comes up as shown in FIG. 8B, in the case that the fluid pressure of the second flow path groove 12 acting via the gap G becomes high. Accordingly, since the constrained state of the seal member 3 is deteriorated in the case mentioned above, the seal member 3 is pushed out further to the outer side due to the fluid pressure of the first flow path groove 11 as shown in FIG. 8C, and there is a risk that the seal member 3 falls away as shown in FIG. 8D in the extreme case.

Figure 9:
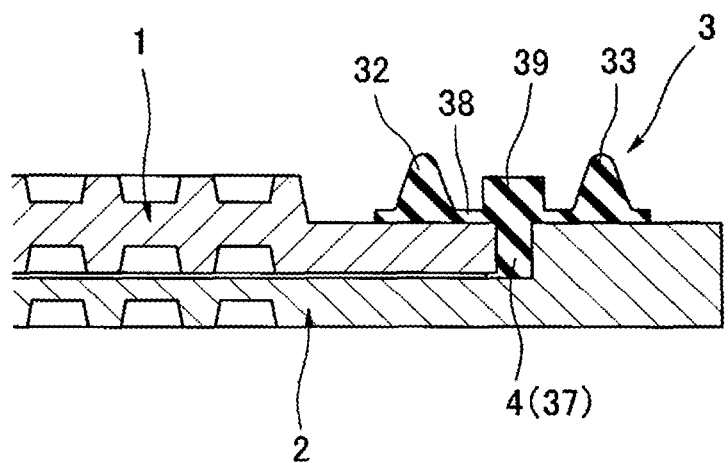
FIG. 9 is a partly cross sectional view showing a single-sided lip type gasket for a fuel cell as a fourth embodiment of the plate-integrated gasket according to the present invention.

Consequently, in order to prevent the seal member 3 from falling away as mentioned above, a fourth embodiment shown in FIG. 9 is structured such that the sheet-like base portion 38 is provided in a protruding manner with a stopper 39 which is positioned between the first and second seal lips 32 and 33 and is backward directed to the fixed convex portion 37, in the single-sided lip type gasket for the fuel cell shown in FIG. 7B.

Figure 10:
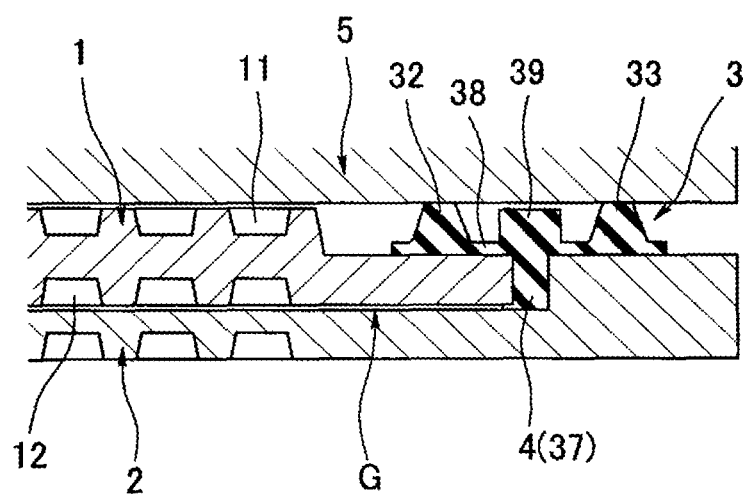
FIG. 10 is a partly cross sectional view of an assembled state and shows the single-sided lip type gasket for the fuel cell as the fourth embodiment of the plate-integrated gasket according to the present invention.

In other words, according to the fourth embodiment, as shown in an assembled state in FIG. 10, the stopper 39 comes close to and faces to the other member 5 with which the first and second seal lips 32 and 33 are brought into close contact in an appropriately compressed state, and the stopper 39 inhibits the fixed convex portion 37 from coming up from the seal fixing groove 4 due to the fluid pressure of the second flow path groove 12 acting via the gap G, on the basis of the contact of the stopper 39 with the other member 5. As a result, it is possible to prevent the seal member 3 from falling away.

Figure 11A:
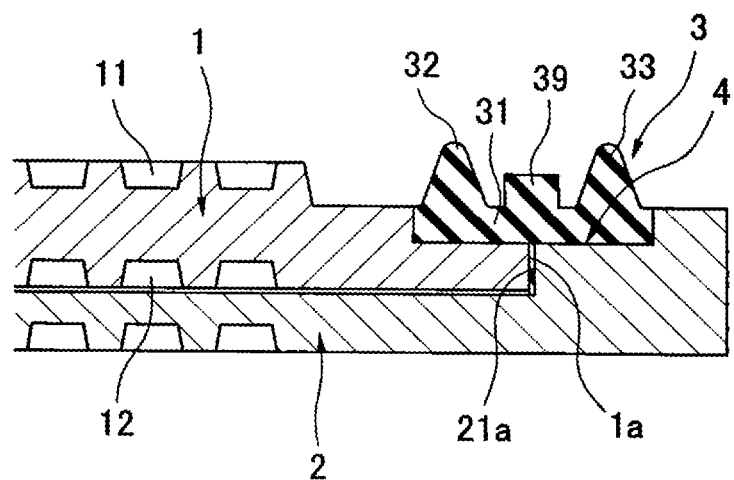
FIGS. 11A and 11B are partly cross sectional views showing the other examples of the single-sided lip type gasket for the fuel cell as the fourth embodiment of the plate-integrated gasket according to the present invention.
Figure 11B:
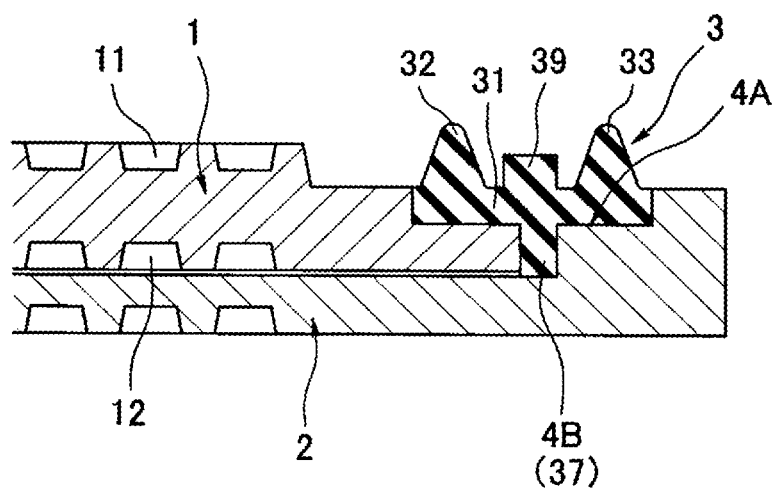

FIGS. 11A and 11B show the other example according to the fourth embodiment, and the other example is structured such that the stopper 39 is provided in a protruding manner so as to be positioned between the first and second seal lips 32 and 33, in the plate-like fixed base portion 31 which is integrally bonded to the inner surface of the seal fixing groove 4, in the single-sided lip type gaskets for the fuel cell respectively shown in FIGS. 7A and 7C. In the example shown in FIG. 11A, the stopper 39 is provided at a position which is backward directed to the fitting portions of the outer peripheral surface 1a of the first separator 1 and the stepped surface 21a of the second separator 2, and in the example shown in FIG. 11B, the stopper 39 is provided at a position which is backward directed to the fixed convex portion 37 (the seal fixing groove 4B). The same effect as that of FIG. 9 can be achieved in both cases.

The stopper 39 may be structured such that the stopper 39 is brought into contact with the other member 5 even in an initial state in which the fixed convex portion 37 does not come up from the seal fixing groove 4. Further, the stopper 39 can be applied to the double-sided lip type gasket for the fuel cell as shown in FIGS. 1, 4 and 6.

Figure 12A:
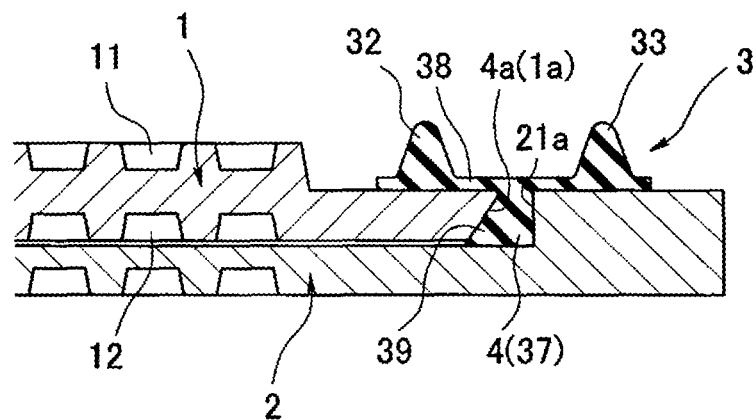
FIGS. 12A, 12B and 12C are partly cross sectional views showing a single-sided lip type gasket for a fuel cell as a fifth embodiment of the plate-integrated gasket according to the present invention.
Figure 12B:
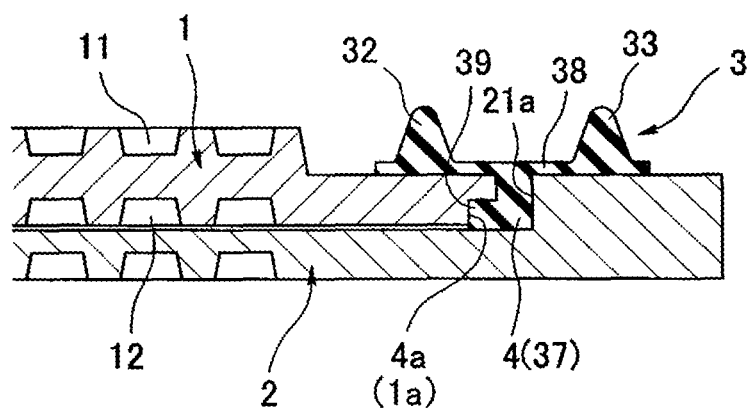
Figure 12C:
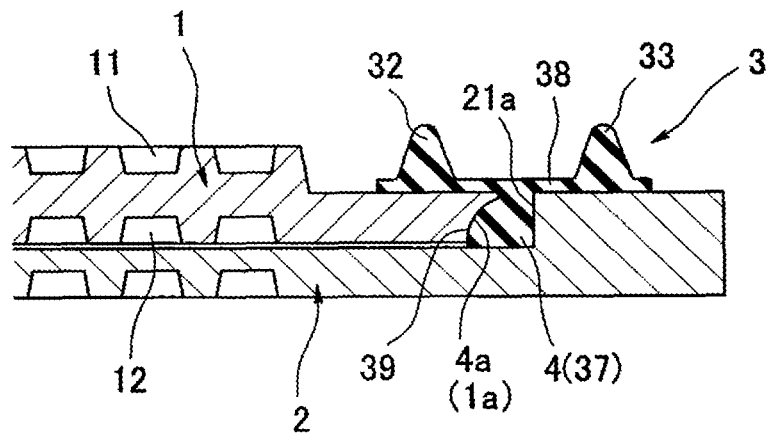

Further, FIGS. 12A to 12C show single-sided lip type gaskets for a fuel cell as a fifth embodiment of the plate-integrated gasket according to the present invention.

The embodiment is structured such that the stopper 39 is extended from the fixed convex portion 37, and is locked to an expanded portion 4a formed in the seal fixing groove 4 by the outer peripheral surface 1a of the first separator 1 and the stepped surface 21a of the second separator 2 which are faced to each other, in the single-sided lip type gasket for the fuel cell shown in FIG. 7B. In other words, the seal fixing groove 4 and the fixed convex portion 37 filled in the seal fixing groove 4 form an undercut. In other words, the expanded portion 4a of the seal fixing groove 4 is formed by setting the outer peripheral surface 1a of the first separator 1 to an inclined surface in the example shown in FIG. 12A, is formed by setting the outer peripheral surface 1a of the first separator 1 to a stepped surface in the example shown in FIG. 12B, and is formed by setting the outer peripheral surface 1a of the first separator 1 to a curved surface in the example shown in FIG. 12C. Therefore, the stopper 39 is formed as a cross sectional shape in conformity to the expanded portion 4a, the stopper 39 being formed together with the fixed convex portion 37 by the molding rubber material being filled in the seal fixing groove 4 at the molding time of the seal member 3.

Therefore, according to the fifth embodiment, the undercut structure obtained by the stopper 39 and the expanded portion 4a of the seal fixing groove 4 inhibits the fixed convex portion 37 from coming up from the seal fixing groove 4 due to the fluid pressure of the second flow path groove 12. As a result, it is possible to prevent the seal member 3 from falling away. Further, as mentioned above, the outer peripheral surface 1a of the first separator 1 is not formed by a forcible extraction shape, but the undercut structure can be formed only by setting the outer peripheral surface 1a to the inclined surface, the stepped surface or the curved surface. Therefore, a molding cost of the first separator 1 is not increased.

Figure 13A:
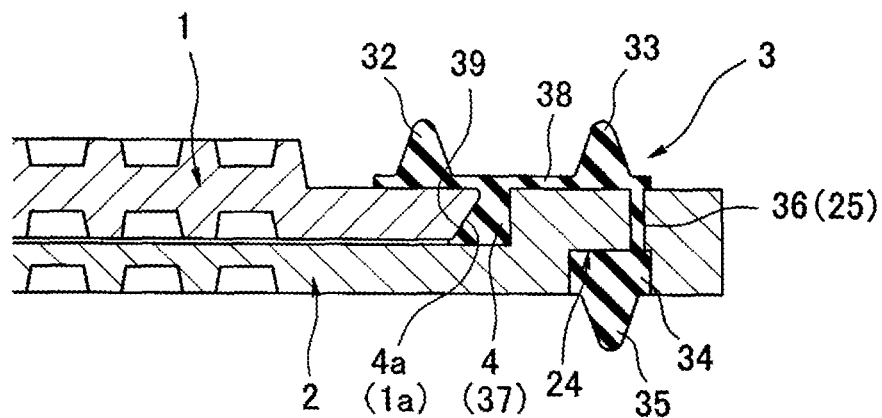
FIGS. 13A, 13B and 13C are partly cross sectional views showing a double-sided lip type gasket for a fuel cell as the fifth embodiment of the plate-integrated gasket according to the present invention.
Figure 13B:
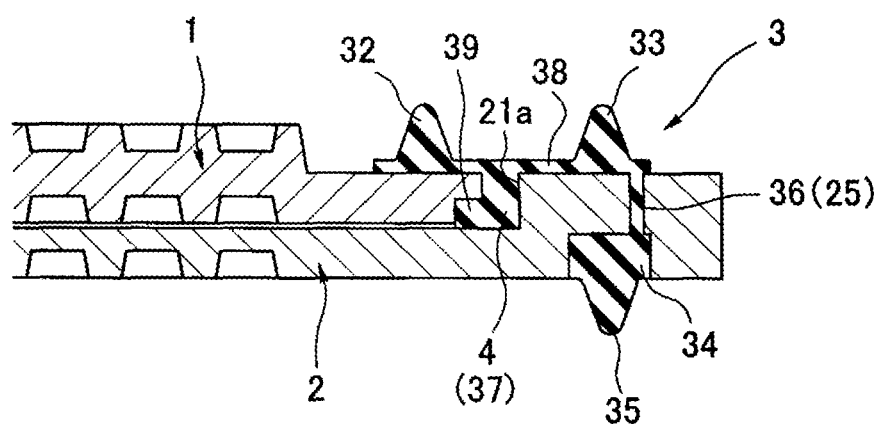
Figure 13C:
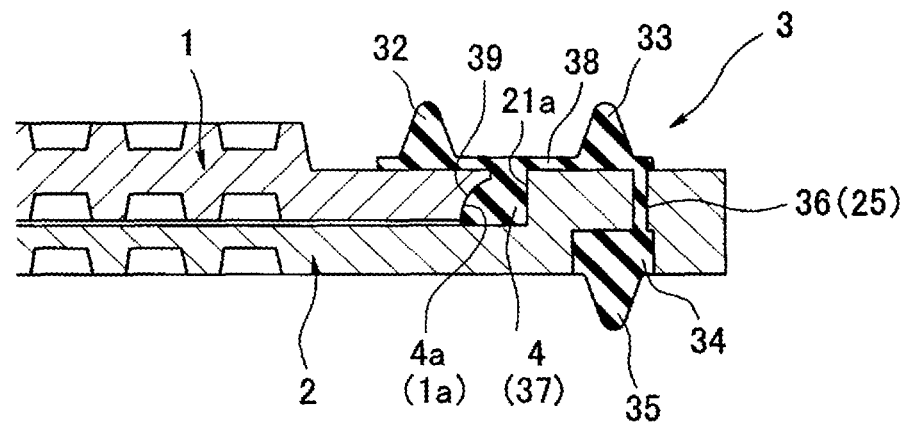

FIGS. 13A to 13C show the other examples according to the fifth embodiment, and the other examples are obtained by applying the undercut structure by the stopper 39 and the expanded portion 4a of the seal fixing groove 4 shown in FIGS. 12A to 12C mentioned above to the double-sided lip type gasket for the fuel cell shown in FIG. 4. The same effect as that of FIG. 12 can be achieved in all the examples.

In the examples shown in FIGS. 12A to 12C and FIGS. 13A to 13C, the expanded portion 4a of the seal fixing groove 4 is formed by the outer peripheral surface 1a of the first separator 1, however, the stepped surface 21a of the second separator 2 may be formed its outer peripheral side as an undercut structure by being set to such a shape as an inclined surface, a stepped surface or a curved surface. In other words, the stopper 39 and the expanded portion 4a may be structured such as to be formed in the outer peripheral side of the fixed convex portion 37 and the seal fixing groove 4.

Figure 14:
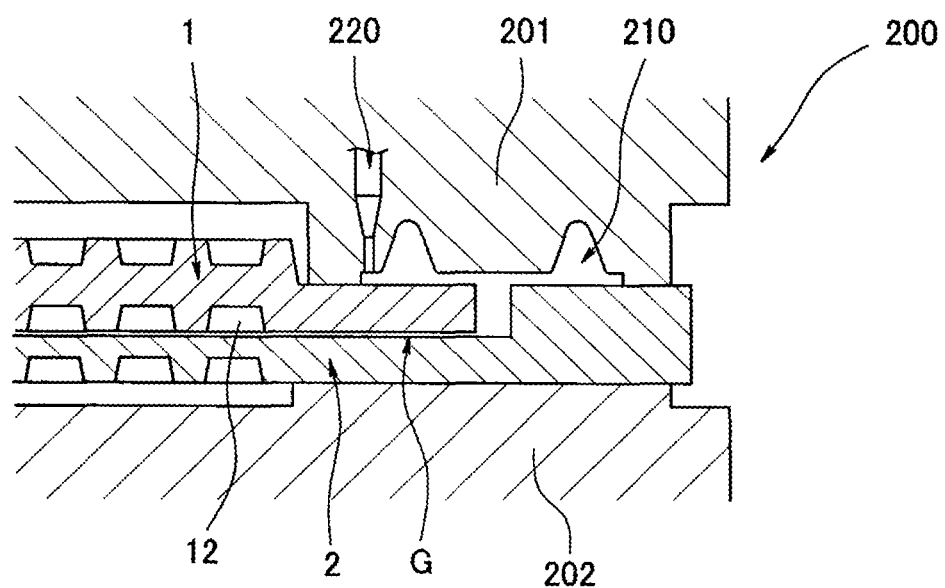
FIG. 14 is a partly cross sectional view showing a metal mold for manufacturing the single-sided lip type gasket for the fuel cell shown in FIG. 7B, and separators which are set to the metal mold.

Here, FIG. 14 shows the metal mold 200 for manufacturing the single-sided lip type gasket for the fuel cell according to the embodiment shown in FIG. 7B. In other words, the single-sided lip type gasket for the fuel cell shown in FIG. 7B is manufactured by setting the first separator 1 and the second separator 2 to the metal mold 200 constructed by the upper mold 201 and the lower mold 202 in a laminated state, filling an unvulcanized molding rubber material in a cavity 210 defined between inner surfaces of the upper mold 201 and the lower mold 202 which are clamped, and the first separator 1 and the second separator 2, via an injection port 220, and integrally forming the seal member 3 in the first separator 1 and the second separator 2 by heating and pressurizing.

Figure 15:
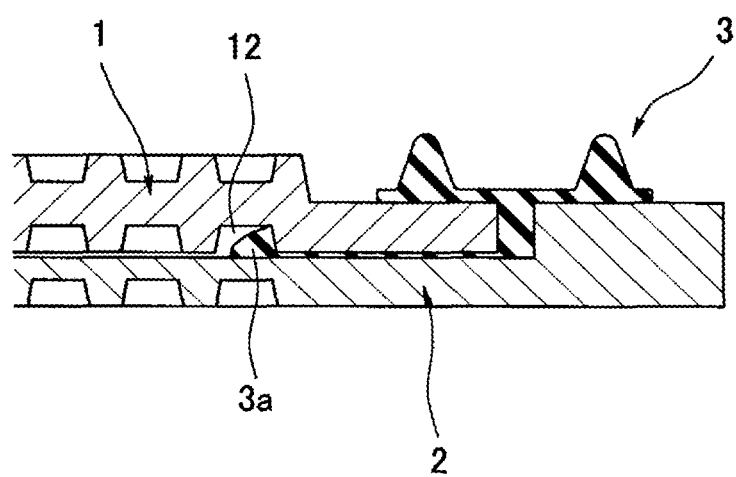
FIG. 15 is a partly cross sectional view showing a state in which a burr generated in a molding process shown in FIG. 14 reaches a flow path side.

However, since a part of the liquid-like molding rubber material which is filled in the cavity 210 flows out to the laminated gap G between the first separator 1 and the second separator 2 on the basis of the filling pressure, there is fear that the burr 3a formed by the outflow of the molding rubber material as mentioned above reaches an inner side of the second flow path groove 12 between the first separator 1 and the second separator 2 as shown in FIG. 15, in some filling pressure or some viscosity of the molding rubber material. Further, in this case, there is a risk that the fluid within the second flow path groove 12 is prevented by the burr 3a from smoothly circulating. Accordingly, a single-sided lip type gasket for a fuel cell as a sixth embodiment shown in FIG. 16 is structured such that the burr 3a is formed at an appropriate length by a burr stop projection 26.

Figure 18:
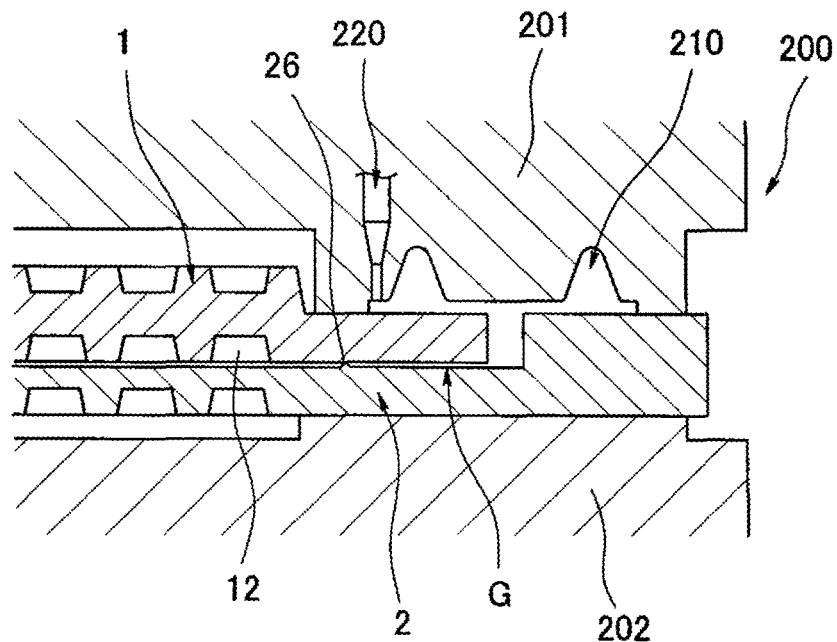
FIG. 18 is a partly cross sectional view showing a metal mold for manufacturing the gasket for the fuel cell according to the sixth embodiment, and separators which are set to the metal mold.

In more detail, as shown in FIG. 17, the burr stop projection 26 is provided in the upper surface of the second separator 2 laminated on the lower surface of the first separator 1, the burr stop projection 26 being brought into close contact with a lower surface in an outer peripheral side of a molding area of the second flow path groove 12 in the first separator 1, and the seal member 3 is formed by setting the first separator 1 and the second separator 2 in the laminated state to the metal mold 200 constructed by the upper mold 201 and the lower mold 202 and clamping the mold as shown in FIG. 18, filling the unvulcanized molding rubber material in the cavity 210 defined between the inner surfaces of the upper mold 201 and the lower mold 202, and the first separator 1 and the second separator 2 via the injection port 220, and heating and pressurizing.

At this time, a part of the liquid-like molding rubber material filled in the cavity 210 is going to flow out to the laminated gap G of the first separator 1 and the second separator 2 on the basis of its filling pressure, however, the outflow is dammed by the burr stop projection 26 brought into close contact with the lower surface of the first separator 1, at the position in the outer peripheral side of the forming area of the second flow path groove 12 in the first separator 1. As a result, the burr 3a formed by the outflow of the molding rubber material is set to an appropriate length by the burr stop projection 26. Therefore, according to the structure, since the circulation of the fluid within the second flow path groove 12 is not prevented by the burr 3a, and an adhesive layer is formed by the burr 3a having the appropriate length (width) between the laminated surface of the first separator 1 and the second separator 2, the first separator 1 and the second separator 2 are well integrated, and the burr 3a achieves the same function as that of the stopper 39 in FIGS. 12 and 13 described above. Accordingly, it is possible to effectively prevent the fixed convex portion 37 from coming up from the seal fixing groove 4 by the fluid pressure.

Figure 19:
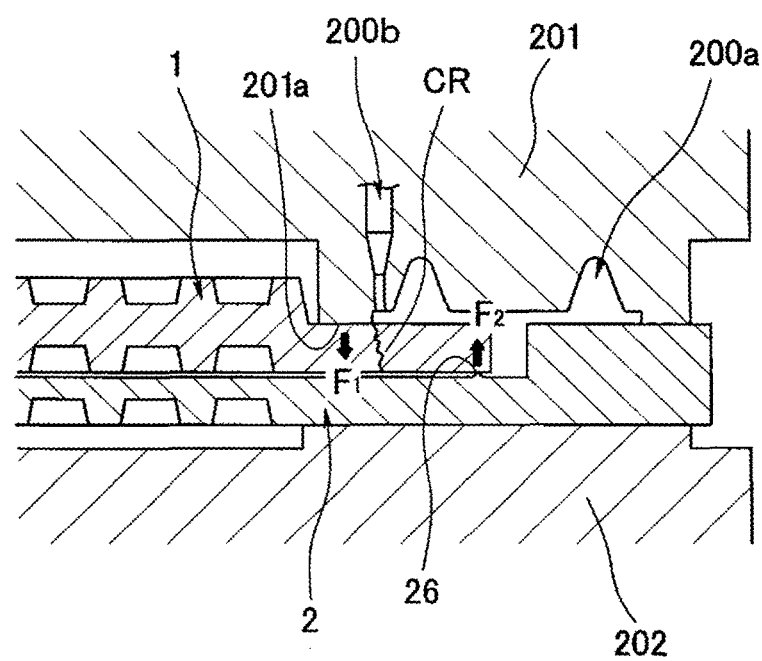
FIG. 19 is a partly cross sectional view showing a comparative example of a metal mold for manufacturing the gasket for the fuel cell according to the sixth embodiment, and separators which are set to the metal mold.

Further, in the case that the burr stop projection 26 of the second separator 2 is structured such as to be brought into close contact with the vicinity of a leading end of the first separator 1, such as a comparative example shown in FIG. 19, the burr stop projection 26 has a positional relationship that the burr stop projection 26 is deviated from an abutting surface 201a of the upper mold 201 which finally clamps an end portion of the cavity 200a in the first separator 1 side, a bending load is applied to the first separator 1, on the basis of a mold clamping force F1 which is applied to the first separator 1 from the abutting surface 201a, and a reaction force F2 which is accordingly generated by the leading end portion of the first separator 1 being pressed to the burr stop projection 26, and there is a risk that a crack CR is generated. As a result, the burr stop projection 26 is preferably formed at the position corresponding to the abutting surface 201a, as shown in FIG. 18.

Further, according to this structure, since the pressure of the molding rubber material filled in the cavity 210 is balanced with the pressure of the molding rubber material circulating around the laminated gap G in both sides of the first separator 1, the bending load is not generated by the pressure of the molding rubber material.

The burr stop projection 26 can be applied to each of the embodiments described above.

Figure 20:
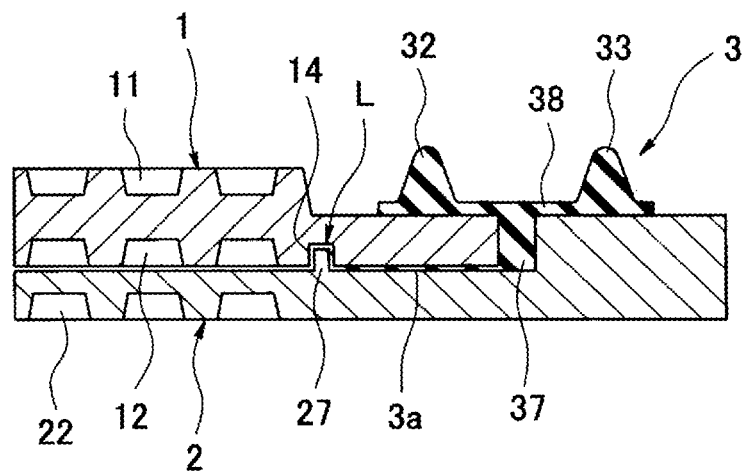
FIG. 20 is a partly cross sectional view showing a single-sided lip type gasket for a fuel cell as a seventh embodiment of the plate-integrated gasket according to the present invention.
Figure 21:
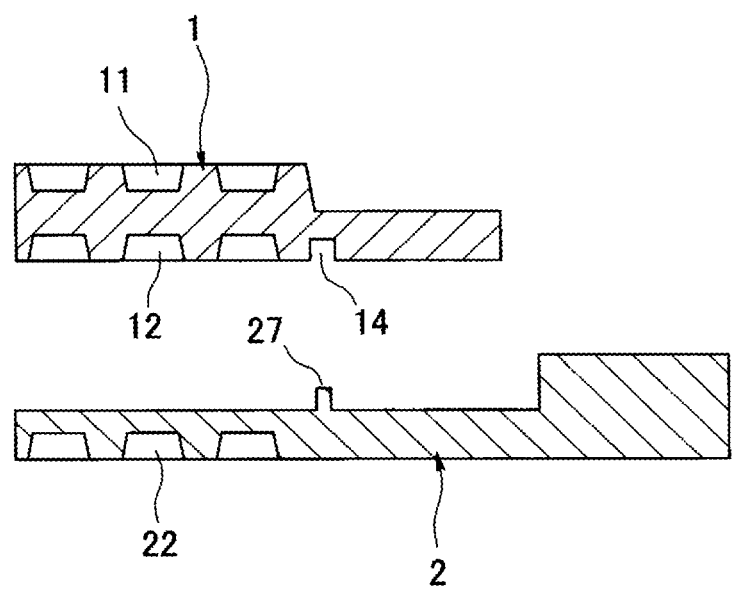
FIG. 21 is a partly cross sectional view showing a separated state of the separators in the seventh embodiment.

A single-sided lip type gasket for a fuel cell as a seventh embodiment shown in FIG. 20 is also structured such that the burr 3a is formed at an appropriate length for the same purpose as that of the sixth embodiment.

In more detail, a projection 27 is provided in the upper surface of the second separator 2 which is laminated on the lower surface of the first separator 1, so as to be positioned in an outer peripheral side of the molding area of the third flow path groove 22 in the second separator 2, and a groove 14 loosely fitted to the projection 27 is provided in a lower surface of the outer peripheral side of the molding area of the second flow path groove 12 in the first separator. Therefore, a burr stop labyrinth clearance gap L having a zigzag bent shape is formed between the projection 27 and the groove 14 which are loosely fitted to each other.

Figure 22:
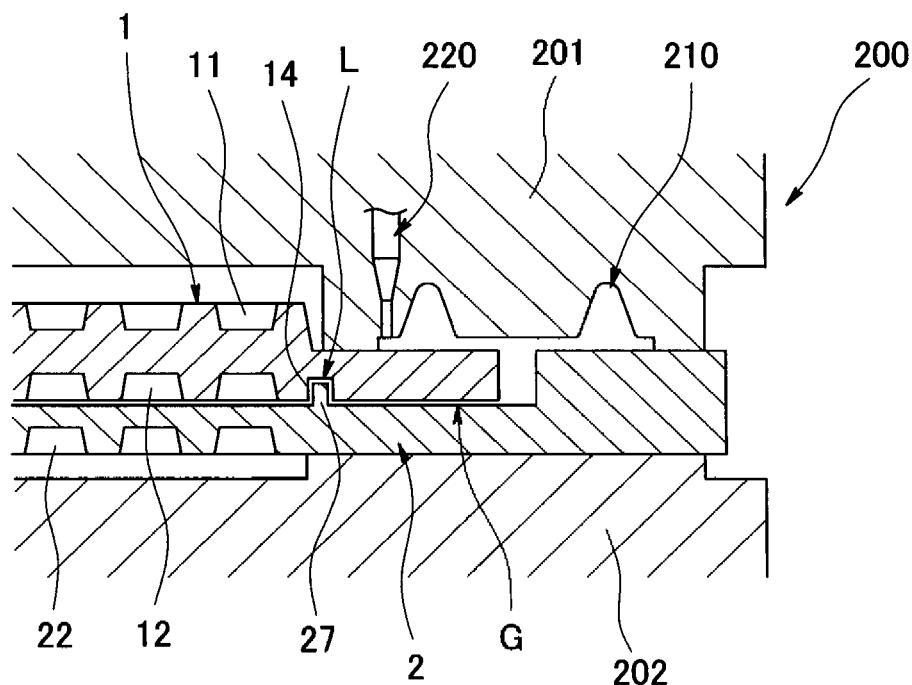
FIG. 22 is a partly cross sectional view showing a metal mold for manufacturing the gasket for the fuel cell according to the seventh embodiment, and separators which are set to the metal mold.
Figure 23:
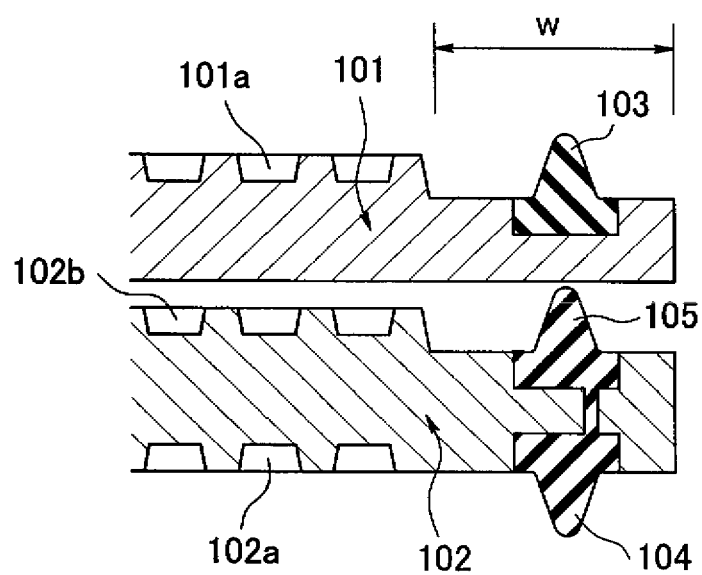
FIG. 23 is a partly cross sectional view showing a gasket for a fuel cell as an example of a plate-integrated gasket according to the prior art.

In other words, in the case that the seal member 3 is molded by setting the first separator 1 and the second separator 2 in the laminated state to the metal mold 200 constructed by the upper mold 201 and the lower mold 202, clamping the mold, filling the unvulcanized molding rubber material in the cavity 210 which is defined between the inner surfaces of the upper mold 201 and the lower mold 202, and the first separator 1 and the second separator 2, via the injection port 220, and heating and pressurizing, as shown in FIG. 22, a part of the liquid-like molding rubber material filled in the cavity 210 is going to flow out to the laminated gap G of the first separator 1 and the second separator 2 on the basis of the filling pressure. However, the outflow pressure is attenuated by a flow resistance of the burr stop labyrinth clearance gap L which is bent zigzag between the projection 27 and the groove 14 which are loosely fitted to each other, and is dammed at the position in the outer peripheral side of the molding area of the second flow path groove 12 in the first separator 1. As a result, the burr 3a formed by the outflow of the molding rubber material is set to an appropriate length by the burr stop labyrinth clearance gap L.

Therefore, according to the structure, since the outflow of the burr 3a can be appropriately controlled in the same manner as the sixth embodiment described above, the burr 3a is not formed into the second flow path groove 12. Further, since the adhesive layer is formed by the burr 3a between the laminated surfaces of the first separator 1 and the second separator 2, the first separator 1 and the second separator 2 are well integrated. Further, since the burr 3a achieves the same function as that of the stopper 39 in FIGS. 12 and 13 described above, it is possible to effectively prevent the fixed convex portion 37 from coming up from the seal fixing groove 4 by the fluid pressure.

Further, since the first separator 1 and the second separator 2 can be positioned with each other by loosely fitting the projection 27 and the groove 14 to each other at the laminating time of the first separator 1 and the second separator 2, it is possible to laminate at a high precision.

Further, since the projection 27 and the groove 14 are loosely fitted to each other, it is not necessary to form them at the position just below the abutting surface 201a of the metal mold 200 as is different from the burr stop projection 26 according to the sixth embodiment described above, and a degree of freedom for design become higher. Further, it is hard to nondestructively inspect the outflow length of the molding rubber material (the length of the burr 3a) in the inner portions of the first separator 1 and the second separator 2, however, since the length of the burr 3a by the projection 27 and the groove 14 is securely defined by the burr stop labyrinth clearance gap L, a labor hour for inspection can be reduced. As a result, it is possible to achieve a cost reduction.

Further, the labyrinth clearance gap L can be applied to each of the embodiments described above in the same manner.

On the contrary to the illustrated example, the projection may be formed in the first separator 1 side, and the groove may be formed in the second separator 2 side.

What is claimed is:

1. A plate-integrated gasket wherein one plate and the other plate are laminated on each other, an outer peripheral surface of the one plate is fitted or loosely fitted to a stepped surface which is formed in the other plate, and a seal member made of an elastic material having a rubber-like elasticity is integrally formed astride both of said one plate and the other plate,
    wherein the outer peripheral surface of the one plate faces the stepped surface of the other plate across a gap,
    the seal member has a fixed portion filled in a seal fixing groove which is formed between said one plate and the other plate, and
    a portion of the seal member extends into the gap to abut each of the outer peripheral surface of the one plate and the stepped surface of the other plate.

2. The plate-integrated gasket according to claim 1, wherein a stopper inhibiting the fixed portion from getting away from the seal fixing groove is formed in the seal member.

3. The plate-integrated gasket according to claim 2, wherein the stopper is extended from the fixed portion, and is locked to an expanded portion which is formed in the seal fixing groove.

4. The plate-integrated gasket according to claim 1, wherein one of respective laminated surfaces of the one plate and the other plate is provided with a burr stop projection which is brought into close contact with the other.

5. The plate-integrated gasket according to claim 1, wherein a projection is provided in one of respective laminated surfaces of the one plate and the other plate, a groove loosely fitted to said projection is provided in the other, and a burr stop labyrinth clearance gap is formed by the projection and the groove which are loosely fitted to each other.

6. The plate-integrated gasket according to claim 2, wherein one of respective laminated surfaces of the one plate and the other plate is provided with a burr stop projection which is brought into close contact with the other.

7. The plate-integrated gasket according to claim 3, wherein one of respective laminated surfaces of the one plate and the other plate is provided with a burr stop projection which is brought into close contact with the other.

8. The plate-integrated gasket according to claim 2, wherein a projection is provided in one of respective laminated surfaces of the one plate and the other plate, a groove loosely fitted to said projection is provided in the other, and a burr stop labyrinth clearance gap is formed by the projection and the groove which are loosely fitted to each other.

9. The plate-integrated gasket according to claim 3, wherein a projection is provided in one of respective laminated surfaces of the one plate and the other plate, a groove loosely fitted to said projection is provided in the other, and a burr stop labyrinth clearance gap is formed by the projection and the groove which are loosely fitted to each other.

10. The plate-integrated gasket according to claim 1, wherein
    the stepped surface is formed toward an inner peripheral side along an outer peripheral portion in a lower side of the other plate.

11. The plate-integrated gasket according to claim 1, wherein
    a first flow path groove is formed on an upper surface of the one plate;
    a second flow path groove is formed on a lower surface of the one plate which is superposed with an upper surface of the other plate; and
    a third flow path groove is formed on a lower surface of the other plate.

12. The plate-integrated gasket according to claim 1, wherein
    a first stepped groove is formed in an upper surface of an outer peripheral portion of the one plate;
    a second stepped groove is formed in an upper surface of an outer peripheral portion of the other plate; and
    the first and second stepped grooves form the seal fixing groove.

13. The plate-integrated gasket according to claim 12, wherein the seal member includes:
    a first seal lip which is positioned on the first stepped groove of the one plate;
    a second seal lip which is positioned on the second groove of the other plate;
    a second fixed portion which is integrally bonded to an inner surface of the seal fixing groove; and
    a third seal lip which protrudes out of the second fixed portion.

14. The plate-integrated gasket according to claim 13, wherein the second fixed portion is connected to the fixed portion via a bridging member which is filled in a communication hole of the other plate.

* * * * *